United States Patent [19]
Kikutani

[11] Patent Number: 5,475,536
[45] Date of Patent: Dec. 12, 1995

[54] LENS SYSTEM FOR READING IMAGE

[75] Inventor: Kazuo Kikutani, Kodaira, Japan

[73] Assignee: Mahk Co., Ltd., Tokyo, Japan

[21] Appl. No.: 199,692

[22] Filed: Feb. 22, 1994

[51] Int. Cl.$^6$ ................................................. G02B 9/06
[52] U.S. Cl. ......................... 359/794; 359/793; 359/717
[58] Field of Search ............................... 359/691, 717, 359/736, 793, 794, 708

[56] References Cited

U.S. PATENT DOCUMENTS 4,525,040  6/1985  Nakamura ................................ 359/794

Primary Examiner—Georgia Y. Epps
Assistant Examiner—Thomas Robbins
Attorney, Agent, or Firm—Spencer, Frank & Schneider

[57] ABSTRACT

A lens system used for reading an image, the system being constructed of two lenses and presents sufficient performance for reading an image in an image scanner, a facsimile, etc. The system is constructed of a positive meniscus image-forming lens and a positive meniscus auxiliary lens. The convexes of both lenses face an object. The image-forming lens has at least one aspherical surface or it has an aspherical surface formed by joining an aspherical surface layer formed of a transparent material to the surface of a spherical glass lens. Both surfaces of the auxiliary lens are aspherical.

2 Claims, 12 Drawing Sheets

LENS SYSTEM FOR READING IMAGE

BACKGROUND OF THE INVENTION

1. Field of the Invention

The present invention relates to a lens system for forming a reduced image used in a device for reading an image of an original document, such as an image scanner, a facsimile, etc.

2. Description of the Related Art

A lens system for forming a reduced image used in an image reading device is mainly constructed of three or more glass lenses, and such a lens system is expensive. Thus, there is an increasing demand for an inexpensive lens system with high performance. Along with such a demand, a resin aspherical lens system constructed of two lenses is proposed but it presents problems, such as insufficient correction of aberration and great dependence upon temperature for reading performance.

SUMMARY OF THE INVENTION

Accordingly, an object of the present invention is to provide a lens system for forming a reduced image used in an image reading device, such system being constructed of two lenses in which aberration is sufficiently corrected and reading performance is less dependent upon temperature.

In order to achieve the above object, the present invention provides a lens system for reading an image, the system comprising a positive meniscus image-forming lens the convex of which faces an object and a positive meniscus auxiliary lens the convex which faces the object in the order from the object, wherein the image-forming lens has at least one aspherical surface and wherein both surfaces of the auxiliary lens are aspherical, the system satisfying the conditions expressed by the following formulas;

$$0.7 < f/f_1 < 1 \tag{1}$$

$$1.7 < f_2/f_1 \tag{2}$$

where $f$ indicates the focal length of the overall system; $f_1$ indicates the focal length of the image-forming lens; and $f_2$ represents the focal length of the auxiliary lens; the system also satisfying the conditions expressed by the following formulas;

$$v_1 > 56 \tag{3}$$

$$0.8 < r_1/r_2 < 1.2 \tag{4}$$

where $v_1$ indicates the Abbe's number of a material forming the image-forming lens; $r_1$ shows the radius of curvature of the front surface of the image-forming lens on the axis; and $r_2$ represents the radius of curvature of the rear surface of the image-forming lens on the axis.

Formula (1) relates to the conditions for the curvature of field and astigmatism. If the ratio of f to $f_1$ is below the lower limit, the curvature of field of the sagittal image is intensified, while the ratio of f to $f_1$ above the upper limit increases astigmatism.

Formula (2) relates to the conditions for temperature compensation. When the auxiliary lens is constructed of a resin, the ratio of $f_2$ to $f_1$ below the lower limit easily varies the refractive index of the auxiliary lens depending upon temperature, thus accordingly changing the back focus of the lenses, further lowering reading performance.

Formula (3) relates to the conditions for chromatic aberration. Since both the image-forming lens and auxiliary lens are formed of positive lenses, a small value of $v_1$ causes insufficient correction of chromatic aberration on the axis and chromatic aberration of magnification.

Formula (4) relates to the conditions for the curvature of field. If the ratio of $r_1$ to $r_2$ is out of the above range, the Petzval's sum is lowered, thus increasing the curvature of field. The ratio below the lower limit increases the curvature of field in the negative direction, while the ratio above the upper limit increases the curvature of field in the positive direction.

When the image-forming lens is formed by joining an aspherical surface layer formed of a transparent material to the surface of a spherical glass lens, the lens system satisfies the conditions expressed by the following formulas;

$$v_1 > 56 \tag{5}$$

$$0.8 < r_1/r_2 < 1.2 \tag{6}$$

where $v_1$ indicates the Abbe's number of a material forming the spherical glass lens portion of the image-forming lens; $r_1$ shows the radius of curvature of the front surface of the image-forming lens on the axis; and $r_2$ represents the radius of curvature of the rear surface thereof on the axis.

The radius of curvature of the spherical glass surface on the axis may be the same as or slightly different from that of the aspherical surface layer which is joined thereto. In order to carry out the present invention, the thickness of the aspherical surface layer has to be 1% or less of the focal length of the overall system, and thus, the image-forming lens is not affected very much by the aspherical surface layer.

Formula (5) is the conditions for improving the correction of chromatic aberration.

Formula (6) restricts a range of the ratio of the front surface of the spherical glass lens portion of the image-forming lens to the rear surface thereof. If the ratio is below the lower limit, the curvature of field is increased in the negative direction, while the ratio above the upper limit increases the curvature of field in the positive direction.

DESCRIPTION OF THE PREFERRED EMBODIMENTS

A description will now be given of the data of the embodiments of the present invention. In the data, the following symbols are employed. Fno: F number; f: focal length, $f_1$: focal length of an image formation lens; $f_2$: focal length of an auxiliary lens; M: magnification rate; and $\omega$: half field angle (unit:degree).

Figure 1:
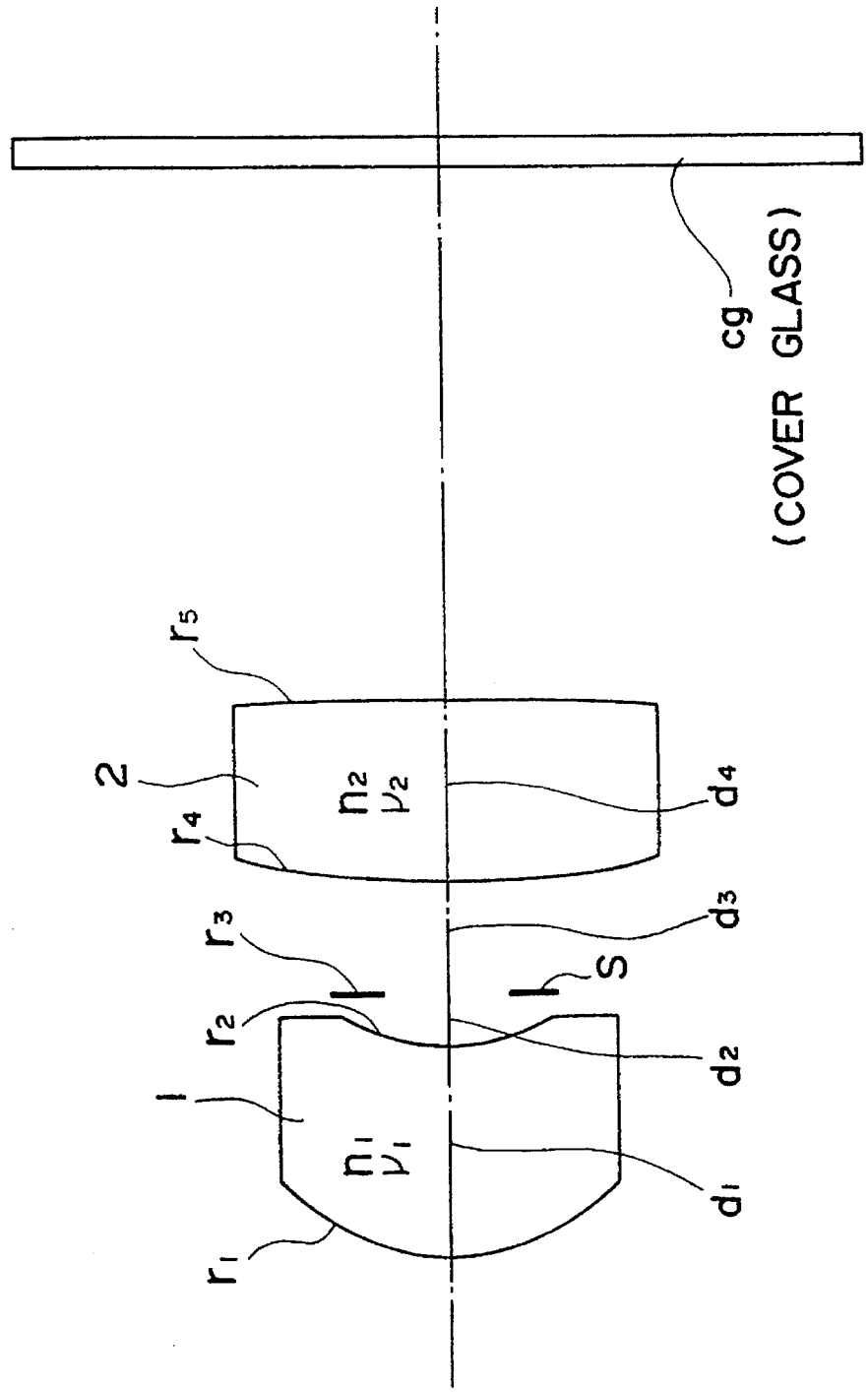
FIG. 1 is a sectional view of Embodiment 1 of a lens system for reading an image according to the present invention.

FIG. 1 shows the construction of lenses of Embodiment 1. Referring to FIG. 1, ri: radius of curvature (radius of curvature on the optical axis if the lens has an aspherical surface) of the ith image from the object; di: surface separation; nj: refractive index at 567 nm of the jth lens from the object; and vj: Abbe's number. The signs ['] and ["] indicate a resin layer. Cover glass of an imaging device is shown in FIGS. 1, 3, 5, 7, 9 and 11 illustrating the constructions of lenses.

The cover glass has a refractive index of 1.52397 at 567 nm, Abbe's number of 60.4 and a thickness of 0.7.

The spherical surface can be obtained by rotating a curve found by the following expression around the optical axis.

$$X=(H^2/r)/[1+(1-(1+K)(H/r)^2)^{1/2}]+A4*H^4+A6*H^6+A8*H^8+A10*H^{10} \quad (1)$$

where X indicates the distance from the vertex of the aspherical surface on the optical axis; H represents the height of the aspherical surface at the position X; r shows the radius of curvature on the optical axis; K represents the conical coefficient; and A4, A6, A8 and A10 indicate the aspherical coefficients of degree 4th, 6th, 8th and 10th, respectively.

TABLE 1

Embodiment 1

| | | | |
|---|---|---|---|
| Fno = 5.0 | f = 100 | M = −0.112 | $\omega$ = 23.5° |
| $r_1$ = 22.562 | $d_1$ = 19.534 | | |
| | $n_1$ = 1.59021 | | $v_1$ = 61.3 |
| $r_2$ = 21.691 | $d_2$ = 4.603 | | |
| $r_3$ = ∞ | $d_3$ = 10.964 | | |
| $r_4$ = 118.509 | $d_4$ = 17.048 | | |
| | $n_2$ = 1.49974 | | $v_2$ = 57.2 |
| $r_5$ = 4435.954 | | | |

Aspherical surface coefficient   $r_2$: K = 1.404443
A4 = 1.897205 × 10$^{-6}$, A6 = −4.891763 × 10$^{-10}$
A8 = −2.075503 × 10$^{-10}$, A10 = 8.653844 × 10$^{-13}$
$r_4$: K = −1.556516 × 10$^{2}$
A4 = 5.287139 × 10$^{-6}$, A6 = 1.852455 × 10$^{-9}$
A8 = 1.639600 × 10$^{-12}$, A10 = 1.070114 × 10$^{-14}$

TABLE 1-continued $r_5$: K = 3.544358 × 10$^{4}$
A4 = −5.126227 × 10$^{-6}$, A6 = 4.634121 × 10$^{-9}$
A8 = −1.652889 × 10$^{-13}$, A10 = 1.855124 × 10$^{-15}$
$f/f_1$ = 0.769
$f_2/f_1$ = 1.872
$n_1$ = 1.59021
$v_1$ = 61.3
$r_1/r_2$ = 1.040

Figure 2:
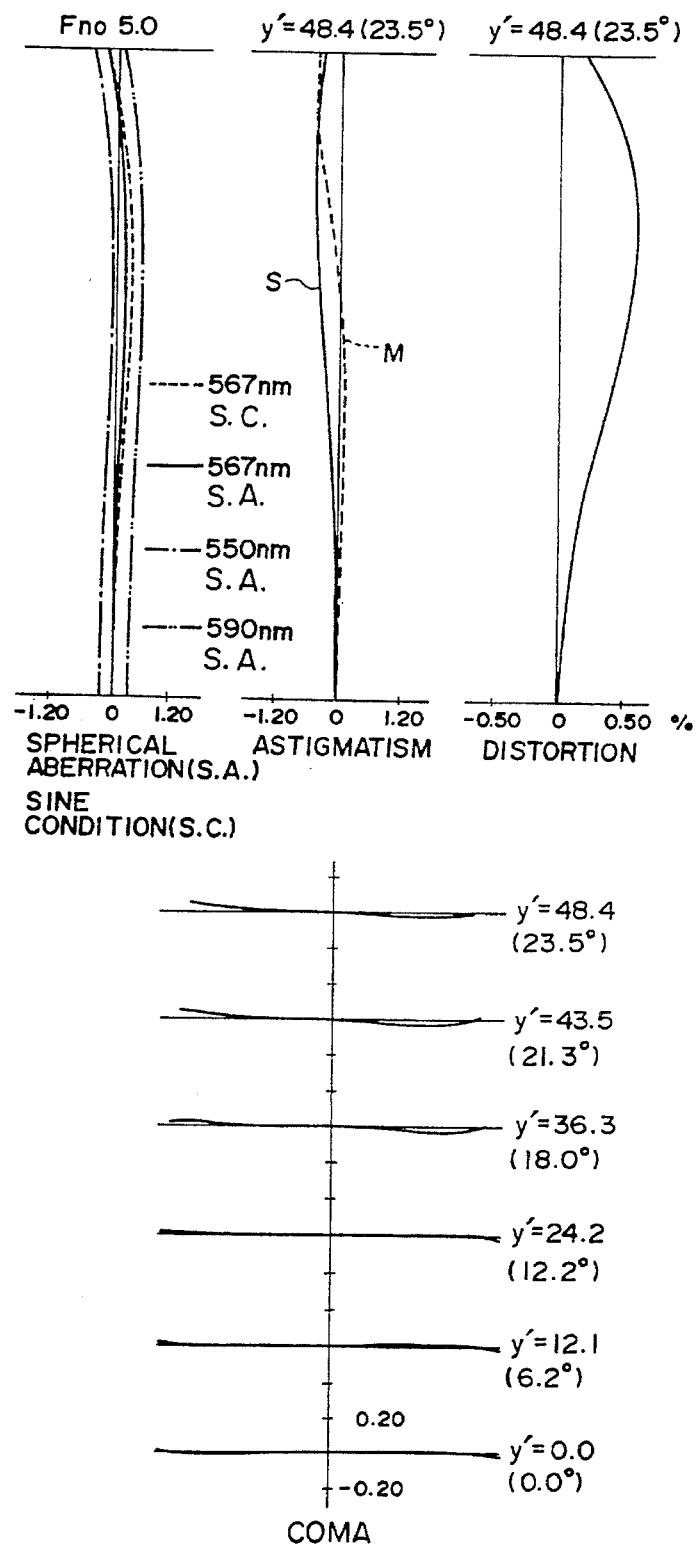
FIG. 2 illustrates various aberration curves of Embodiment 1 of the lens system for reading an image according to the present invention.

FIGS. 1 and 2 show the construction of the lens system and aberration curves thereof, respectively, in Embodiment 1.
Aspherical surface coefficient

TABLE 2

Embodiment 2

| | | | |
|---|---|---|---|
| Fno = 5.0 | f = 100 | M = −0.112 | $\omega$ = 23.5° |
| $r_1$ = 20.72 | $d_1$ = 17.43 | | |
| | $n_1$ = 1.5177 | | $v_1$ = 64.2 |
| $r_2$ = 22.493 | $d_1'$ = 0.02 | | |
| | $n_1'$ = 1.5081 | | $v_1'$ = 53.4 |
| $r_2'$ = 22.493 | $d_2$ = 2.111 | | |
| $r_3$ = ∞ | $d_3$ = 13.193 | | |
| $r_4$ = 180.936 | $d_4$ = 18.707 | | |
| | $n_2$ = 1.49974 | | $v_2$ = 57.2 |
| $r_5$ = 1212.285 | | | |

Aspherical surface coefficient   $r_2'$: K = 1.470007
A4 = 5.845228 × 10$^{-6}$, A6 = −2.504175 × 10$^{-8}$
A8 = 1.009690 × 10$^{-9}$, A10 = −9.037050 × 10$^{-12}$
$r_4$: K = −4.093812 × 10$^{2}$
A4 = −1.523428 × 10$^{-6}$, A6 = 1.530858 × 10$^{-9}$
A8 = 3.490559 × 10$^{-11}$, A10 = −3.305265 × 10$^{-14}$
$r_5$: K = −8.772776 × 10$^{3}$
A4 = −5.410825 × 10$^{-6}$, A6 = 1.174184 × 10$^{-9}$
A8 = 8.628285 × 10$^{-13}$, A10 = 1.554584 × 10$^{-15}$
$f/f_1$ = 0.858
$f_2/f_1$ = 3.630
$n_1$ = 1.51770
$v_1$ = 64.2
$r_1/r_2$ = 0.921

Figure 3:
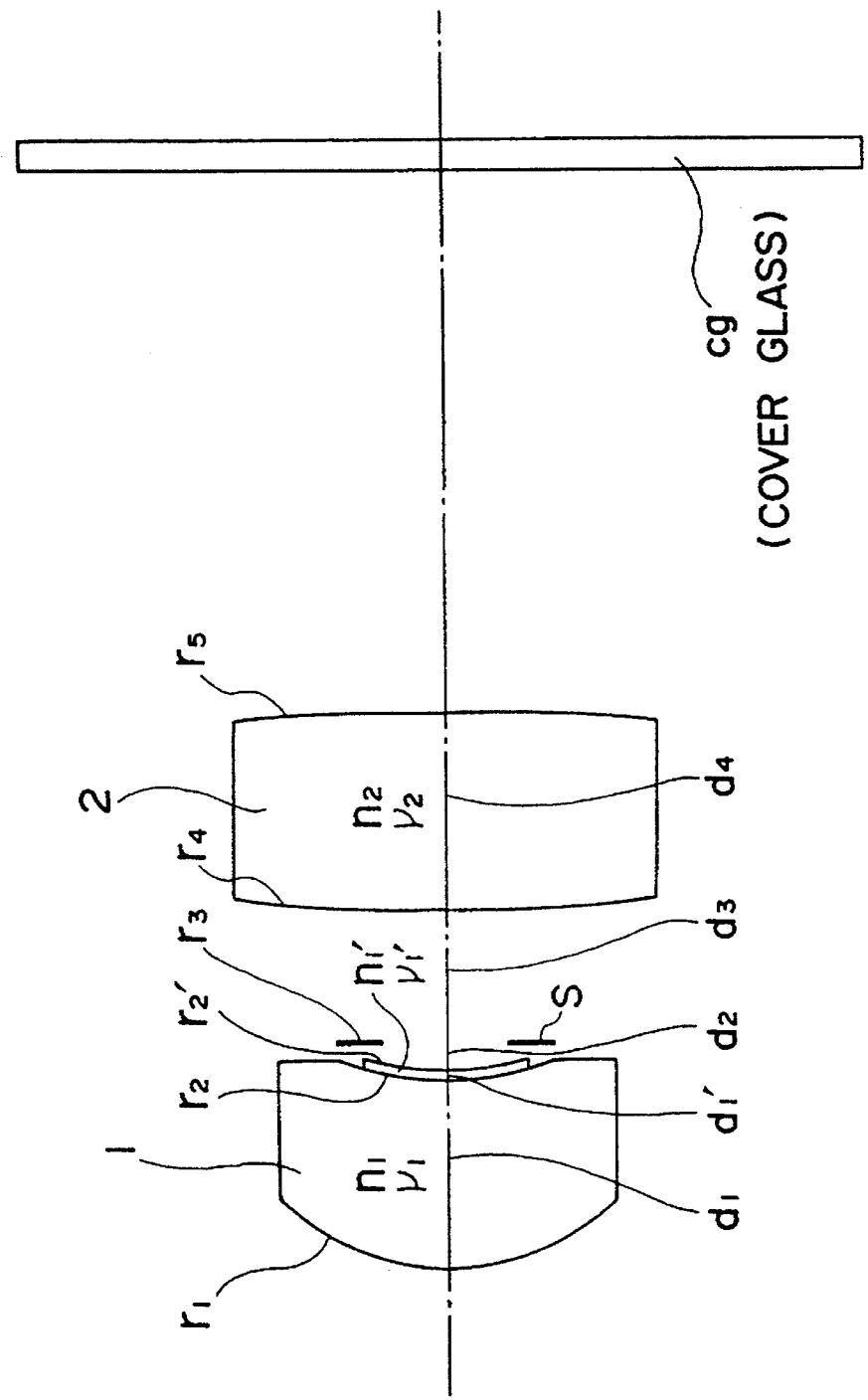
FIG. 3 is a sectional view of Embodiment 2 of a lens system for reading an image according to the present invention.
Figure 4:
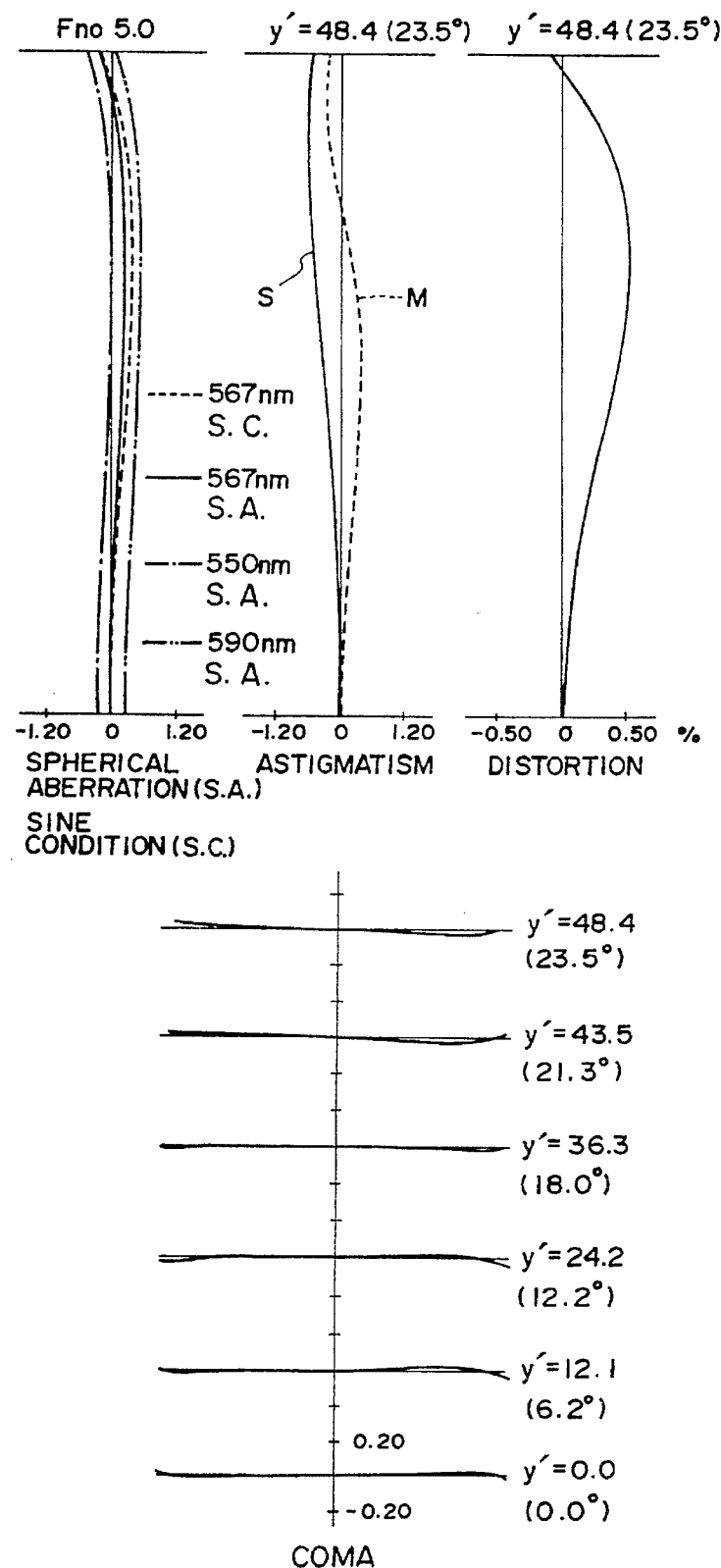
FIG. 4 illustrates various aberration curves of Embodiment 2 of the lens system for reading an image according to the present invention.

FIGS. 3 and 4 show the construction of the lens system and aberration curves thereof, respectively, in Embodiment 2.
Aspherical surface coefficient

TABLE 3

Embodiment 3

| | | | |
|---|---|---|---|
| Fno = 5.0 | f = 100 | M = −0.112 | $\omega$ = 23.5° |
| $r_1$ = 20.162 | $d_1$ = 17.385 | | |
| | $n_1$ = 1.49768 | | $v_1$ = 81.6 |
| $r_2$ = 22.126 | $d_1'$ = 0.04 | | |
| | $n_1'$ = 1.5081 | | $v_1'$ = 53.4 |
| $r_2'$ = 22.126 | $d_2$ = 2.033 | | |
| $r_3$ = ∞ | $d_3$ = 12.851 | | |
| $r_4$ = 190.17 | $d_4$ = 18.828 | | |
| | $n_2$ = 1.49974 | | $v_2$ = 57.2 |
| $r_5$ = 1224.562 | | | |

Aspherical surface coefficient   $r_2'$: K = 1.491037
A4 = 6.340339 × 10$^{-6}$, A6 = −2.331678 × 10$^{-8}$
A8 = 1.216586 × 10$^{-9}$, A10 = −1.113879 × 10$^{-11}$
$r_4$: K = −4.531385 × 10$^{2}$
A4 = −9.606576 × 10$^{-7}$, A6 = 3.673582 × 10$^{-9}$
A8 = 3.931115 × 10$^{-11}$, A10 = −4.032205 × 10$^{-14}$
$r_5$: K = −8.772776 × 10$^{3}$
A4 = −5.164614 × 10$^{-6}$, A6 = 1.236475 × 10$^{-9}$
A8 = 1.137988 × 10$^{-12}$, A10 = 2.439613 × 10$^{-15}$
$f/f_1$ = 0.865
$f_2/f_1$ = 3.874
$n_1$ = 1.49768
$v_1$ = 81.6
$r_1/r_2$ = 0.911

TABLE 3-continued

Figure 5:
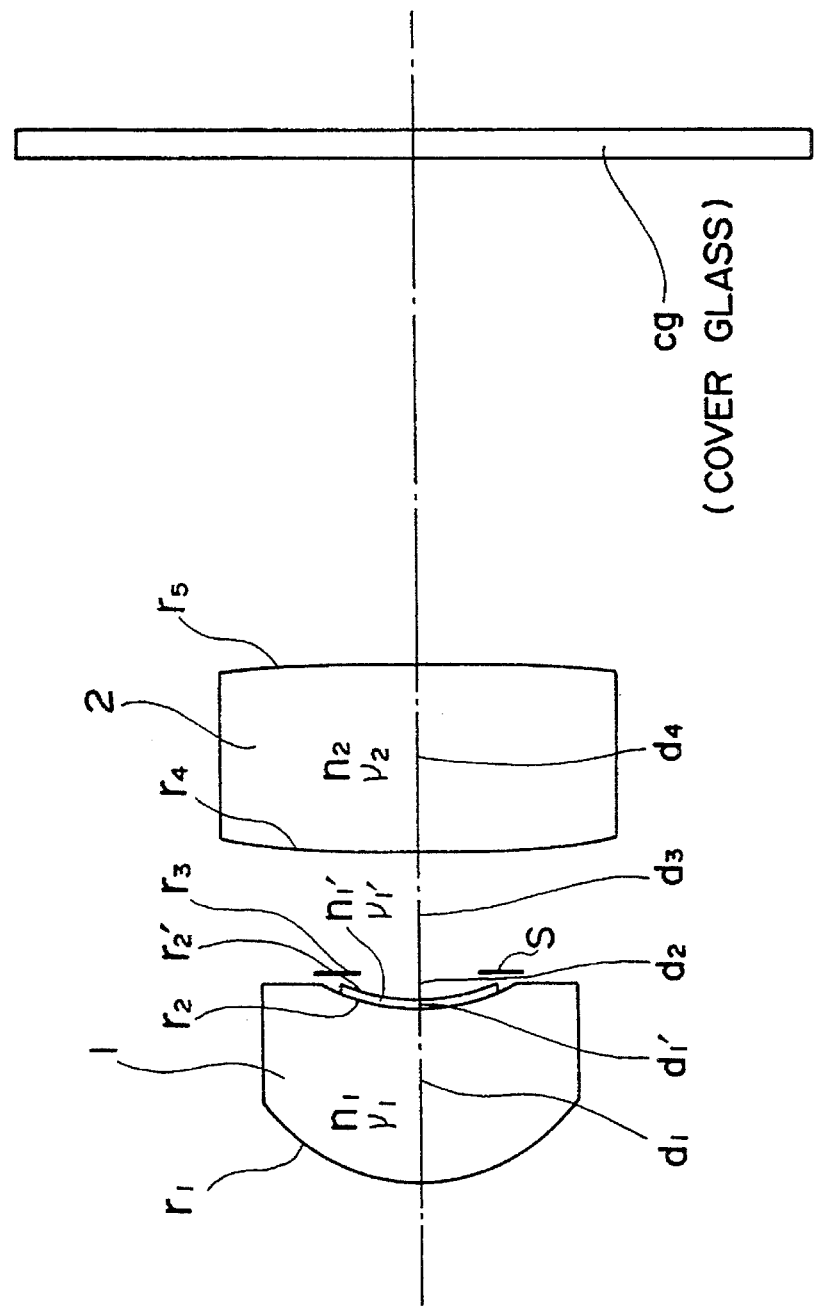
FIG. 5 is a sectional view of Embodiment 3 of a lens system for reading an image according to the present invention.
Figure 6:
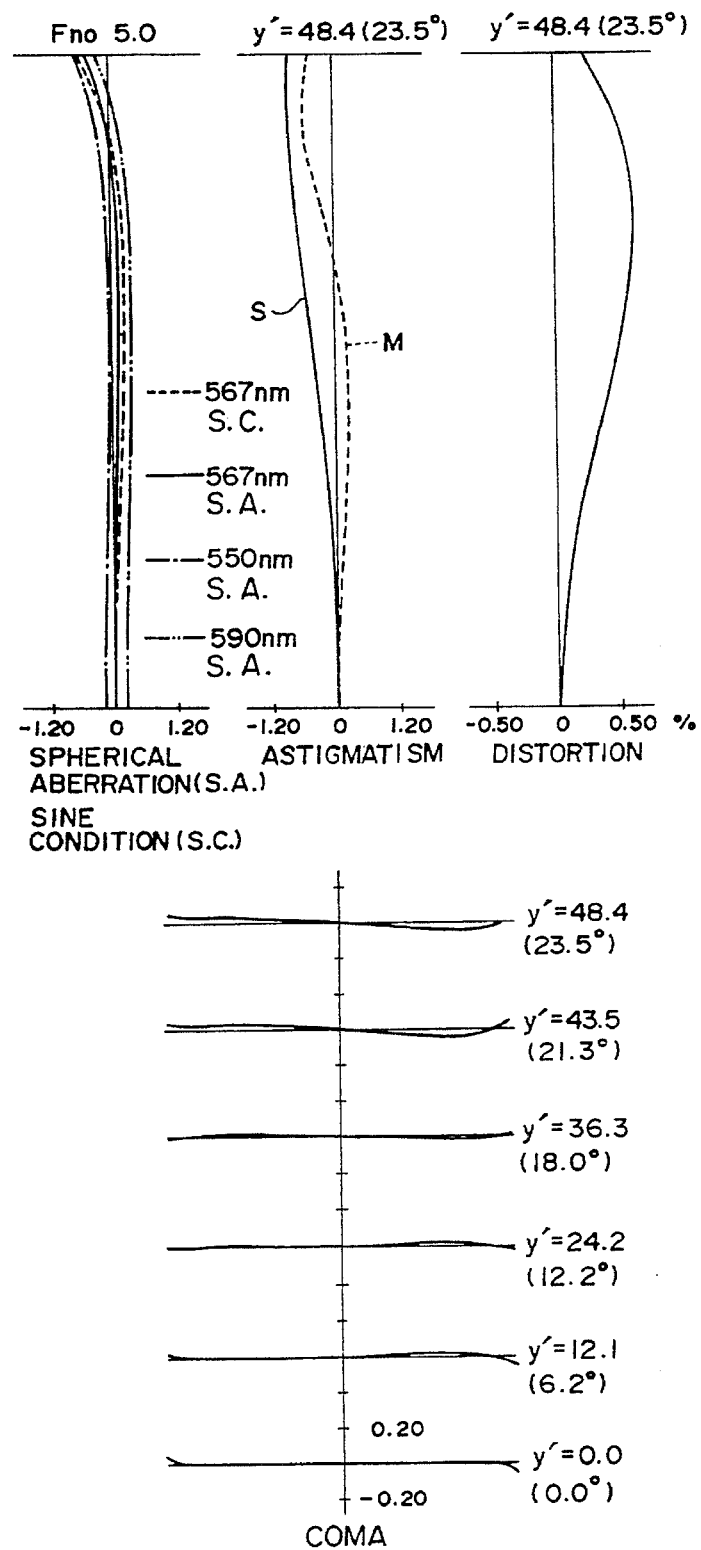
FIG. 6 illustrates various aberration curves of Embodiment 3 of the lens system for reading an image according to the present invention.

FIGS. 5 and 6 show the construction of the lens system and aberration curves thereof, respectively, in Embodiment 3.
Aspherical surface coefficient

TABLE 4

Embodiment 4

Fno = 5.0    f = 100    M = −0.112    ω = 27.3°
$r_1$ = 19.743    $d_1$ = 14.414
             $n_1$ = 1.49768    $v_1$ = 81.6
$r_2$ = 21.61    $d_1'$ = 0.038
             $n_1'$ = 1.5081    $v_1'$ = 53.4
$r_2'$ = 21.61    $d_2$ = 1.946
$r_3$ = ∞     $d_3$ = 18.428
$r_4$ = 65.624    $d_4$ = 22.546
             $n_2$ = 1.49974    $v_2$ = 57.2
$r_5$ = 88.286
Aspherical surface coefficient    $r_2'$: K = 9.142997 × 10$^{-1}$
A4 = 6.513708 × 10$^{-6}$, A6 = 6.820391 × 10$^{-8}$
A8 = −9.867978 × 10$^{-10}$, A10 = 9.276107 × 10$^{-12}$
$r_4$: K = −2.670720 × 10$^1$
A4 = 4.274421 × 10$^{-6}$, A6 = −3.961212 × 10$^{-9}$
A8 = 1.072707 × 10$^{-11}$, A10 = −7.172134 × 10$^{-15}$
$r_5$: K = −4.892400
A4 = −3.995427 × 10$^{-6}$, A6 = 4.549663 × 10$^{-9}$
A8 = −3.385518 × 10$^{-12}$, A10 = 2.394233 × 10$^{-15}$
f/$f_1$ = 0.778
$f_2$/$f_1$ = 2.989
$n_1$ = 1.49768
$v_1$ = 81.6
$r_1$/$r_2$ = 0.914

Figure 7:
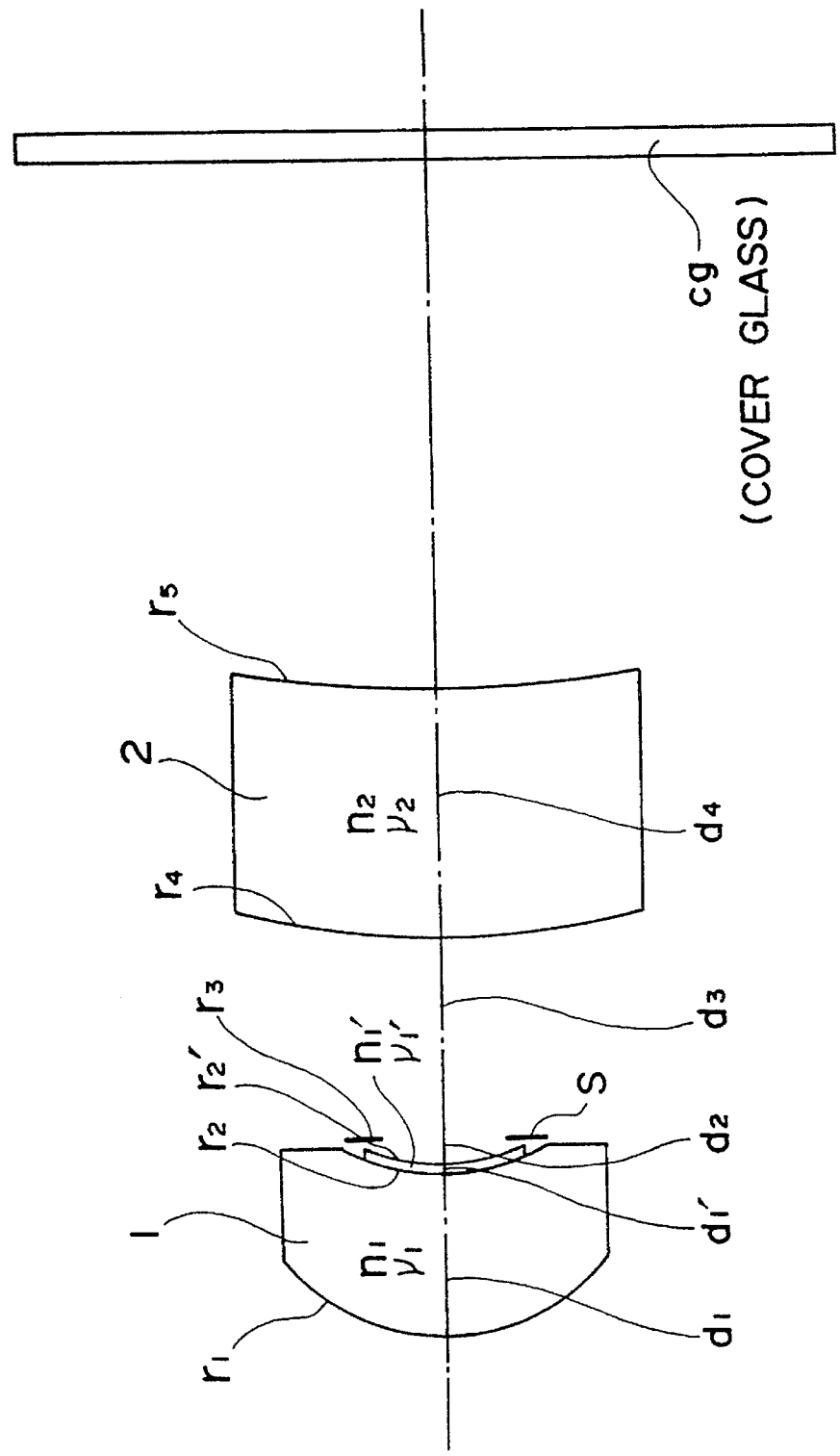
FIG. 7 is a sectional view of Embodiment 4 of a lens system for reading an image according to the present invention.
Figure 8:
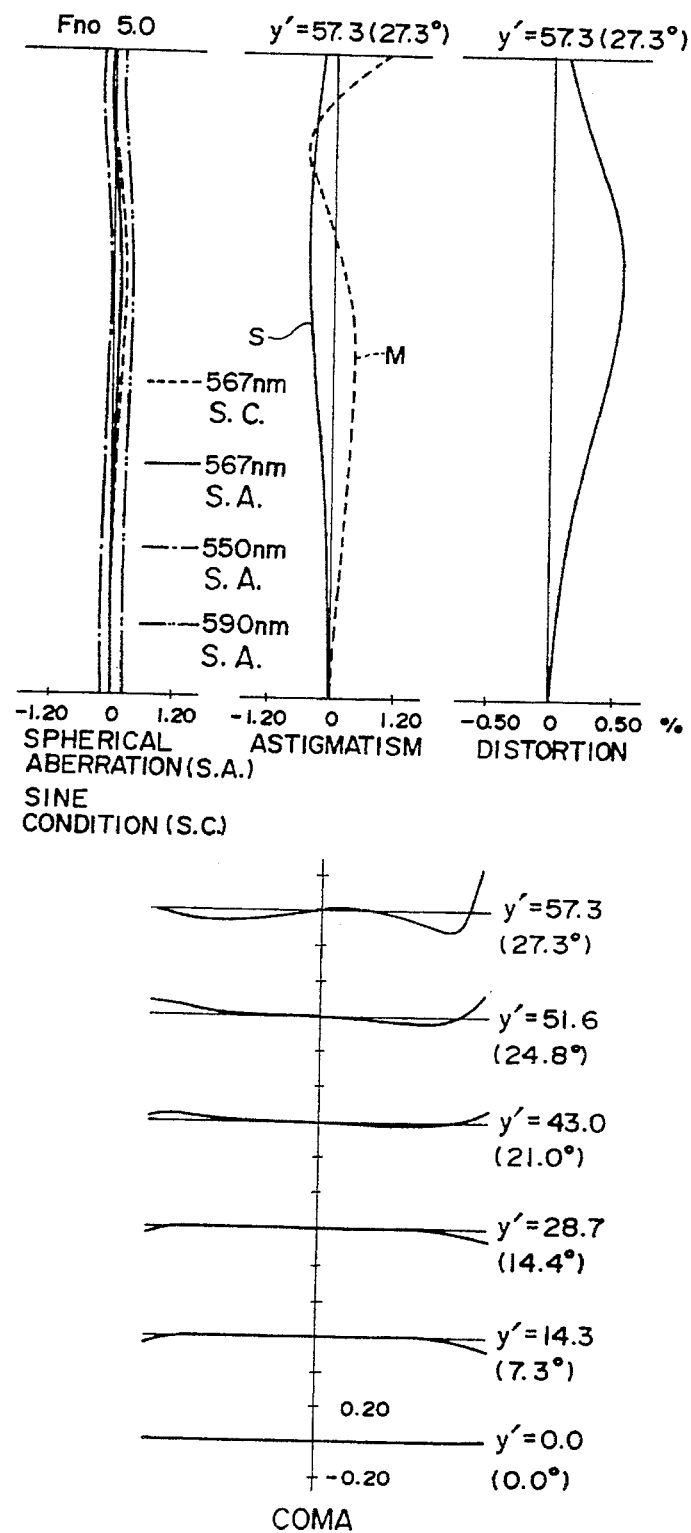
FIG. 8 illustrates various aberration curves of Embodiment 4 of the lens system for reading an image according to the present invention.

FIGS. 7 and 8 show the construction of the lens system and aberration curves thereof, respectively, in Embodiment 4.
Aspherical surface coefficient

TABLE 5

Embodiment 5

Fno = 4.8    f = 100    M = −0.112    ω = 27.2°
$r_1$ = 21.388    $d_1$ = 15.067
             $n_1$ = 1.49768    $v_1$ = 81.6
$r_2$ = 24.168    $d_1'$ = 0.02
             $n_1'$ = 1.5081    $v_1'$ = 53.4
$r_2'$ = 24.168    $d_2$ = 4.407
$r_3$ = ∞     $d_3$ = 21.605
$r_4$ = 49.847    $d_4$ = 19.652
             $n_2$ = 1.49974    $v_2$ = 57.2
$r_5$ = 61.442
Aspherical surface coefficient    $r_2'$: K = 1.006933
A4 = 3.314231 × 10$^{-6}$, A6 = 7.672304 × 10$^{-8}$
A8 = −8.894386 × 10$^{-10}$, A10 = 4.778378 × 10$^{-12}$
$r_4$: K = −1.275443 × 10$^1$
A4 = 4.728228 × 10$^{-6}$, A6 = −3.221839 × 10$^{-9}$
A8 = 3.087372 × 10$^{-12}$, A10 = −1.010067 × 10$^{-15}$
$r_5$: K = −4.892400
A4 = −1.757500 × 10$^{-6}$, A6 = 3.844492 × 10$^{-9}$
A8 = −2.730043 × 10$^{-12}$, A10 = 1.348791 × 10$^{-15}$
f/$f_1$ = 0.75
$f_2$/$f_1$ = 2.535
$n_1$ = 1.49768
$v_1$ = 81.6
$r_1$/$r_2$ = 0.885

Figure 9:
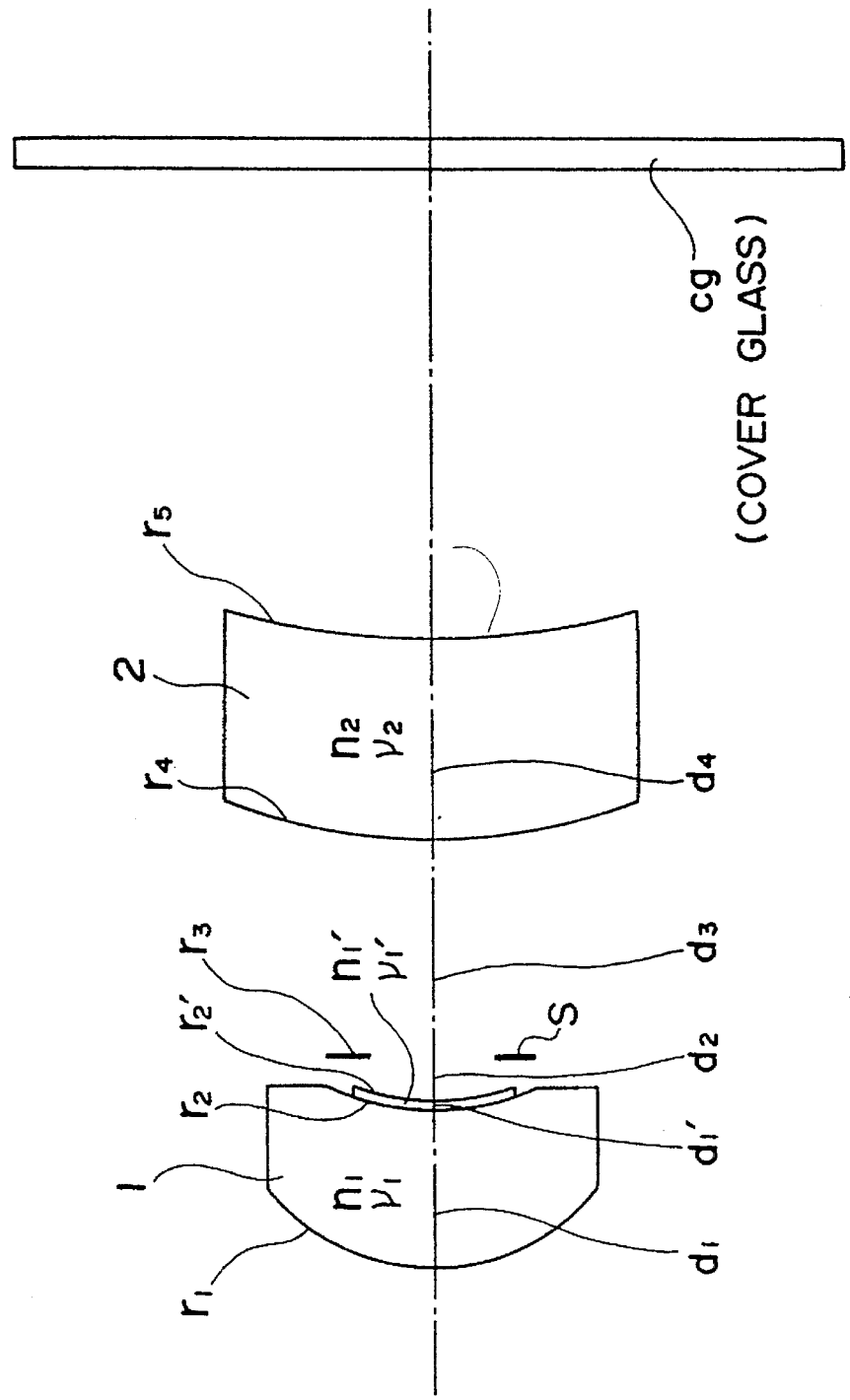
FIG. 9 is a sectional view of Embodiment 5 of a lens system for reading an image according to the present invention.
Figure 10:
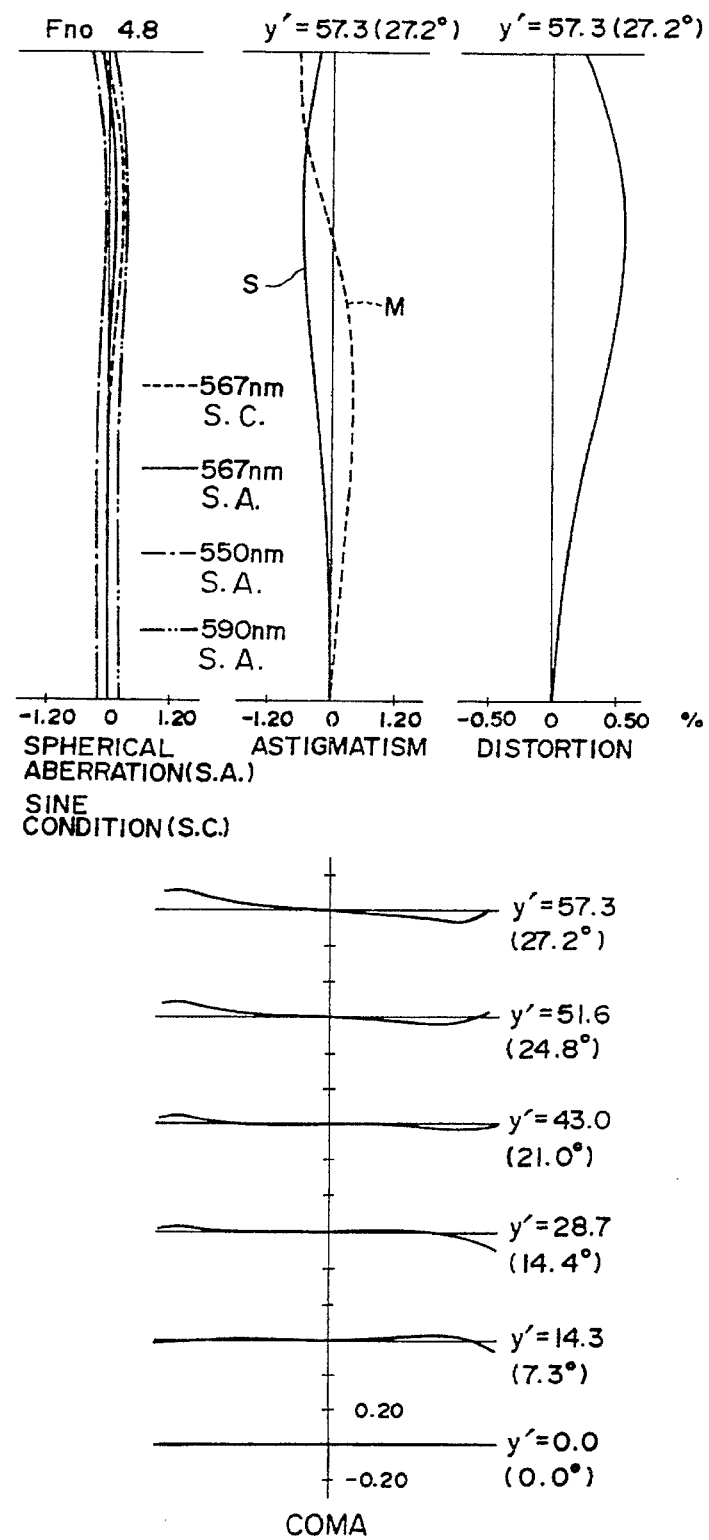
FIG. 10 illustrates various aberration curves of Embodiment 5 of the lens system for reading an image according to the present invention.

FIGS. 9 and 10 show the construction of the lens system and aberration curves thereof, respectively, in Embodiment 5.
Aspherical surface coefficient

TABLE 6

Embodiment 6

Fno = 5.0    f = 100    M = −0.112    ω = 23.3°
$r_1'$ = 21.351    $d_1'$ = 0.02
              $n_1'$ = 1.5081    $v_1'$ = 53.4

TABLE 6-continued $r_1$ = 21.351    $d_1$ = 19.395
              $n_1$ = 1.5177    $v_1$ = 64.2
$r_2$ = 23.331    $d_1''$ = 0.02
              $n_1''$ = 1.5081    $v_1''$ = 53.4
$r_2'$ = 23.331    $d_2$ = 3.066
$r_3$ = ∞     $d_3$ = 15.283
$r_4'$ = 113.519    $d_4'$ = 0.061
              $n_2'$ = 1.5081    $v_2'$ = 53.4
$r_4$ = 163.324    $d_4$ = 13.903
              $n_2$ = 1.5177    $v_2$ = 64.2
$r_5$ = ∞     $d_4''$ = 0.02
              $n_2''$ = 1.5081    $v_2''$ = 53.4
$r_5'$ = 160.825
Aspherical surface coefficient    $r_1'$: K = −8.272100 × 10$^{-2}$
A4 = 6.844655 × 10$^{-7}$, A6 = 1.104998 × 10$^{-10}$
A8 = 1.000614 × 10$^{-11}$, A10 = −1.347705 × 10$^{-15}$
$r_2'$: K = 1.498567
A4 = 5.747443 × 10$^{-6}$, A6 = 2.067392 × 10$^{-8}$
A8 = 4.055150 × 10$^{-10}$, A10 = −5.355515 × 10$^{-12}$
$r_4'$: K = −1.097447 × 10$^2$
A4 = −1.396143 × 10$^{-6}$, A6 = 2.390182 × 10$^{-10}$
A8 = 2.649030 × 10$^{-11}$, A10 = −2.706438 × 10$^{-14}$
$r_5'$: K = −1.101243 × 10$^2$
A4 = −5.478847 × 10$^{-6}$, A6 = 2.065225 × 10$^{-9}$
A8 = 1.736284 × 10$^{-12}$, A10 = 1.124983 × 10$^{-15}$
f/$f_1$ = 0.90
$f_2$/$f_1$ = 5.936
$n_1$ = 1.51770
$v_1$ = 64.2
$r_1$/$r_2$ = 0.915

Figure 11:
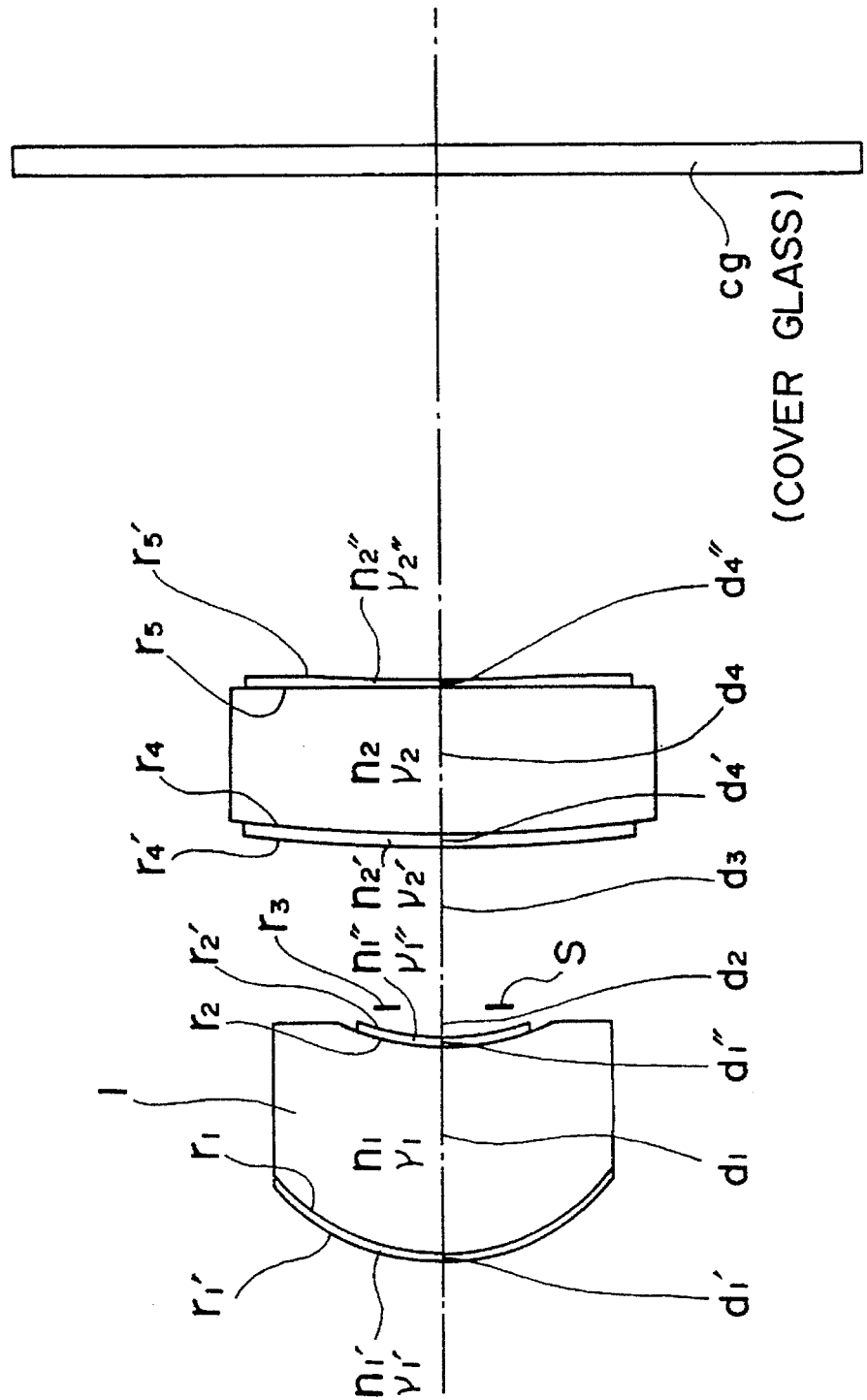
FIG. 11 is a sectional view of Embodiment 6 of a lens system for reading an image according to the present invention.
Figure 12:
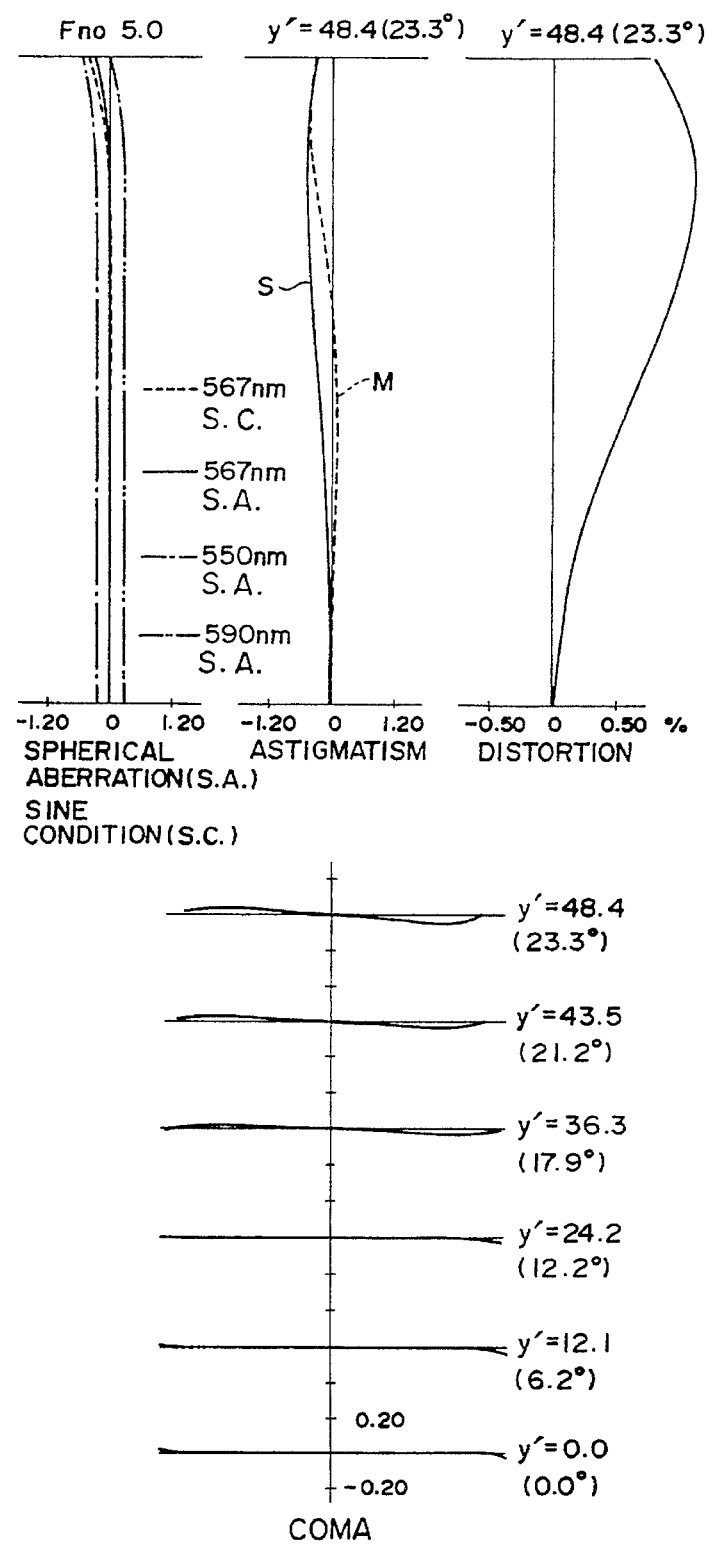
FIG. 12 illustrates various aberration curves of Embodiment 6 of the lens system for reading an image according to the present invention.

FIGS. 11 and 12 show the construction of the lens system and aberration curves thereof, respectively, in Embodiment 6.
Aspherical surface coefficient As will be clearly understood from the foregoing detailed description, the present invention provides an inexpensive lens system used for reading an image, which system is simply constructed of two lenses and has sufficient reading performance.

What is claimed is:

1. A lens system for reading an image, said system comprising a positive meniscus image-forming lens the convex of which faces an object and a positive meniscus auxiliary lens the convex which faces said object in the order from said object, wherein said image-forming lens has at least one aspherical surface and wherein both surfaces of said auxiliary lens are aspherical, said system satisfying the conditions expressed by the following formulas;

$$0.7 < f/f_1 < 1 \quad (1)$$

$$1.7 < f_2/f_1 \quad (2)$$

where f indicates the focal length of the overall system; $f_1$ shows the focal length of said image-forming lens; and $f_2$ represents the focal length of said auxiliary lens; said system also satisfying the conditions expressed by the following formulas;

$$v_1 > 56 \quad (3)$$

$$0.8 < r_1/r_2 < 1.2 \quad (4)$$

where $v_1$ indicates the Abbe's number of a material forming said image-forming lens; $r_1$ shows the radius of curvature of the front surface of said image-forming lens on the axis; and $r_2$ represents the radius of curvature of the rear surface of said image-forming lens on the axis.

2. A lens system for reading an image, said system comprising a positive meniscus image-forming lens the convex of which faces an object and a positive meniscus auxiliary lens the convex which faces said object in the order from said object, wherein said image-forming lens has at least one aspherical surface which is formed by joining an aspherical surface layer formed of a transparent material to the surface of a spherical glass lens, and wherein both surfaces of said auxiliary lens are aspherical, said system satisfying the conditions expressed by the following formulas;

$$0.7 < f/f_1 < 1 \tag{1}$$

$$1.7 < f_2/f_1 \tag{2}$$

where f indicates the focal length of the overall system; $f_1$ shows the focal length of said image-forming lens; and $f_2$ represents the focal length of said auxiliary lens, said system also satisfying the conditions expressed by the following formulas;

$$v_1 > 56 \tag{5}$$

$$0.8 < r_1/r_2 < 1.2 \tag{6}$$

where $v_1$ indicates the Abbe's number of a material forming the spherical glass lens portion of said image-forming lens; $r_1$ shows the radius of curvature of the front surface of said image-forming lens on the axis; and $r_2$ represents the radius of curvature of the rear surface of said image-forming lens on the axis.

* * * * *